US009082401B1

(12) United States Patent
Fructuoso et al.

(10) Patent No.: US 9,082,401 B1
(45) Date of Patent: Jul. 14, 2015

(54) TEXT-TO-SPEECH SYNTHESIS

(71) Applicants: Javier Gonzalvo Fructuoso, London (GB); Alexander Gutkin, Cambridge (GB)

(72) Inventors: Javier Gonzalvo Fructuoso, London (GB); Alexander Gutkin, Cambridge (GB)

(73) Assignee: Google Inc., Mountain View, CA (US)

( * ) Notice: Subject to any disclaimer, the term of this patent is extended or adjusted under 35 U.S.C. 154(b) by 240 days.

(21) Appl. No.: 13/737,419

(22) Filed: Jan. 9, 2013

(51) Int. Cl.
*G10L 15/14* (2006.01)
*G10L 13/08* (2013.01)

(52) U.S. Cl.
CPC .................................... *G10L 13/08* (2013.01)

(58) Field of Classification Search
CPC ........................................................ G10L 15/14
USPC ............................................... 704/256, 256.1
See application file for complete search history.

(56) References Cited

U.S. PATENT DOCUMENTS

| | | | | |
|---|---|---|---|---|
| 6,963,837 | B1 * | 11/2005 | Finke et al. | 704/256 |
| 7,035,791 | B2 * | 4/2006 | Chazan et al. | 704/207 |
| 8,195,462 | B2 * | 6/2012 | Blewett et al. | 704/256 |
| 8,234,116 | B2 * | 7/2012 | Liu et al. | 704/256.3 |
| 8,244,534 | B2 * | 8/2012 | Qian et al. | 704/256.3 |
| 8,321,222 | B2 * | 11/2012 | Pollet et al. | 704/260 |
| 8,340,965 | B2 * | 12/2012 | Yan et al. | 704/258 |
| 8,798,998 | B2 * | 8/2014 | Song et al. | 704/258 |
| 8,873,813 | B2 * | 10/2014 | Tadayon et al. | 382/118 |
| 2008/0059190 | A1 | 3/2008 | Chu et al. | |
| 2012/0143611 | A1 | 6/2012 | Qian et al. | |

OTHER PUBLICATIONS

Gonzalvo et al., "Local Minimum Generation Error Criterion for a Hybrid HMM Speech Synthesis," Interspeech Conference 2009, Sep. 2009, p. 416-419.

Silen, et al., "Using Robust Viterbi Algorithm and HMM-Modeling in Unit Selection TTS to Replace Units of Poor Quality", Interspeech 2010, Sep. 26-30, 2010, p. 166-169, Makuhari, Chiba, Japan.

Tiomkin et al., "A Hybrid Text-to-Speech System That Combines Concatenative and Statistical Synthesis Units," IEEE Transactions on Audio, Speech and Language Processing, vol. 19, No. 5, Jul. 2011.

Fukada et al., "An Adaptive Algorithm for Mel-Cepstral Analysis of Speech," 1992 IEEE, IEEE Proceedings, Mar. 1992, p. I-138-I-140.

(Continued)

*Primary Examiner* — Susan McFadden
(74) *Attorney, Agent, or Firm* — McDonnell Boehnen Hulbert & Berghoff LLP

(57) ABSTRACT

The present disclosure describes example systems, methods, and devices for generating a synthetic speech signal. An example method may include determining a phonemic representation of text. The example method may also include identifying one or more finite-state machines ("FSMs") corresponding to one or more phonemes included in the phonemic representation of the text. A given FSM may be a compressed unit of recorded speech that simulates a Hidden Markov Model. The example method may further include determining a selected sequence of models that minimizes a cost function that represents a likelihood that a possible sequence of models substantially matches a phonemic representation of text. Each possible sequence of models may include at least one FSM. The method may additionally include generating a synthetic speech signal based on the selected sequence that includes one or more spectral features generated from at least one FSM included in the selected sequence.

20 Claims, 10 Drawing Sheets

(56) References Cited

OTHER PUBLICATIONS

Allahverdyan et al., "Comparative Analysis of Viterbi Training and Maximum Likelihood Estimation for HMMs," Neural Information Processing Systems Conference, Dec. 2012, p. 1674-1682, p. 1-S-2.

Yoshimura Takayoshi, Simultaneous Modeling of Phonetic and Prosodic Parameters, and Characteristic Conversion for HMM-Based Text-To-Speech Systems, Doctoral Thesis, Department of Electrical and Computer Engineering, Nagoya Institute of Technology, Jan. 2002, Chapters 3, 4 and 5, pp. 14-48.

* cited by examiner

TEXT-TO-SPEECH SYNTHESIS

BACKGROUND

Unless otherwise indicated herein, the materials described in this section are not prior art to the claims in this application and are not admitted to be prior art by inclusion in this section.

A text-to-speech system (TTS) may be employed to generate synthetic speech based on text. A first example TTS system may concatenate one or more recorded speech units to generate synthetic speech. A second example TTS system may concatenate one or more statistical models of speech to generate synthetic speech. A third example TTS system may concatenate recorded speech units with statistical models of speech to generate synthetic speech. In this regard, the third example TTS system may be referred to as a hybrid TTS system.

SUMMARY

A method is disclosed. The method may include determining a phonemic representation of text that includes one or more linguistic targets. Each of the one or more linguistic targets may include one or more phonemes. The method may also include identifying one or more finite-state machines ("FSMs") that correspond to one of the one or more phonemes included in the one or more linguistic targets. Each of the one or more FSMs may be a compressed recorded speech unit that simulates a Hidden Markov Model ("HMM") by averaging one or more spectral features of a recorded speech unit over N states. N may be a positive integer. The method may further include determining one or more possible sequences of synthetic speech models based on the phonemic representation of text. Each of the one or more possible sequences may include at least one FSM. The method may additionally include determining, from the one or more possible sequences of synthetic speech models, a selected sequence of models that minimizes a value of a cost function. The cost function may represent a likelihood that one of the one or more possible sequences substantially matches the phonemic representation of text. The method may additionally include generating, by a computing system having a processor and a memory, a synthetic speech signal based on the selected sequence. The synthetic speech signal may include information indicative of one or more spectral features generated from at least one FSM included in the selected sequence.

A computer-readable memory having stored therein instructions executable by a computing system is disclosed. The instructions may include instructions for determining a phonemic representation of text that includes one or more linguistic targets. Each of the one or more linguistic targets may include one or more phonemes. The instructions may also include instructions for identifying one or more finite-state machines ("FSMs") that correspond to one of the one or more phonemes included in the one or more linguistic targets. A given FSM may be a compressed recorded speech unit that simulates a HMM by averaging one or more spectral features of a recorded speech unit over N states. N may be a positive integer. The instructions may further include instructions for determining one or more possible sequences of synthetic speech models based on the phonemic representation of text. Each of the one or more possible sequences may include at least one FSM. The instructions may additionally include instructions for determining, from the one or more possible sequences of synthetic speech models, a selected sequence of models that minimizes a value of a cost function. The cost function may represent a likelihood that one of the one or more possible sequences substantially matches the phonemic representation of text. The instructions may additionally include instructions for generating a synthetic speech signal based on the selected sequence. The synthetic speech signal may include information indicative of one or more spectral features generated from at least one FSM included in the selected sequence.

A computing system is disclosed. The computing system may include a data storage having stored therein program instructions and a plurality of FSMs. Each FSM in the plurality of FSMs may be a compressed recorded speech unit that simulates an HMM by averaging one or more spectral features of a recorded speech unit over N states. N may be a positive integer. The computing system may also include a processor. Upon executing the program instructions stored in the data storage, the processor may be configured to determine a phonemic representation of text that includes one or more linguistic targets. Each of the one or more linguistic targets may include one or more phonemes. The processor may also be configured to identify one or more FSMs included in the plurality of FSMs that correspond to one of the one or more phonemes included in the one or more linguistic targets. The processor may be further configured to determine one or more possible sequences of synthetic speech models based on the phonemic representation of text. Each of the one or more possible sequences may include at least one FSM. The processor may be further configured to determine, from the one or more possible sequences of synthetic speech models, a selected sequence that minimizes a value of a cost function. The cost function may represent a likelihood that one of the one or more possible sequences substantially matches the phonemic representation of the text. The processor may also be configured to generate a synthetic speech signal based on the selected sequence. The synthetic speech signal may include information indicative of one or more spectral features generated from an FSM included in the selected sequence.

These as well as other aspects, advantages, and alternatives, will become apparent to those of ordinary skill in the art by reading the following detailed description, with reference where appropriate to the accompanying drawings.

DETAILED DESCRIPTION

Figure 1:
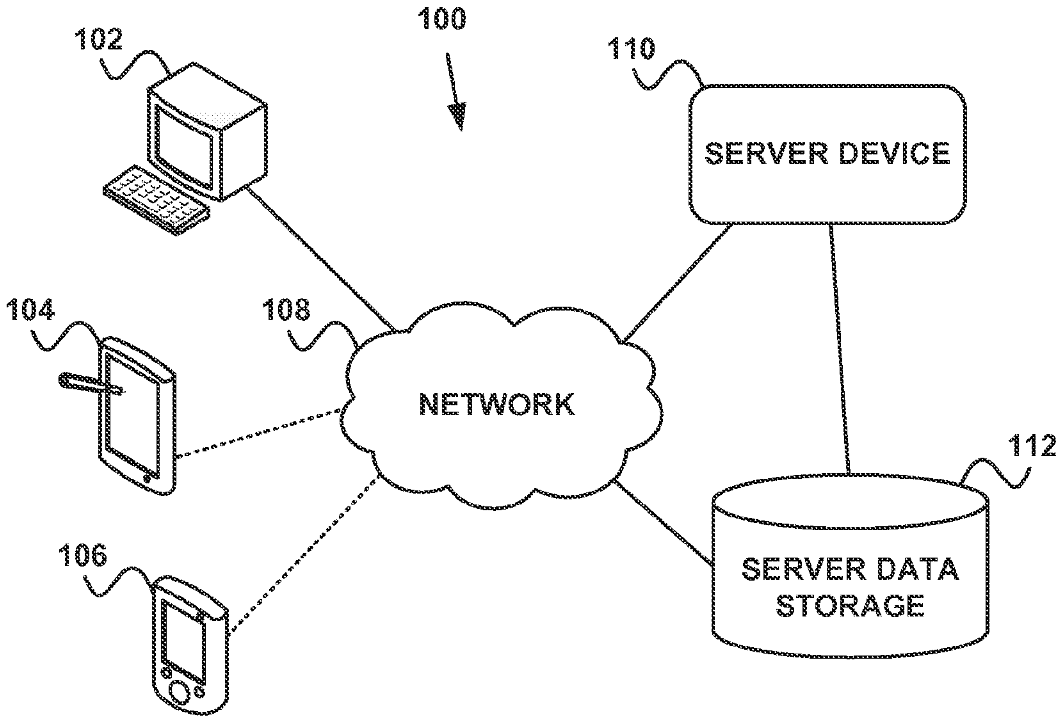
FIG. 1 depicts an example distributed computing architecture.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that aspects of the present disclosure, as generally described herein and illustrated in the figures, can be arranged, substituted, combined, separated, and designed in a wide variety of different configurations, all of which are contemplated herein.

Disclosed herein are methods, systems, and devices for generating a synthetic speech signal using a hybrid text-to-speech ("TTS") system. An example method may include determining a phonemic representation of text. As used herein, the term "phonemic representation" may refer to text represented as one or more phonemes indicative of a pronunciation of the text, perhaps by representing the text as a sequence of one or more linguistic targets. Each linguistic target may include a prior phoneme, a current phoneme, and a next phoneme. The linguistic target may also include information indicative of one or more phonetic features that provide information indicative of how the phoneme is pronounced. The one or more linguistic targets may be determined using any algorithm, method, and/or process suitable for parsing text in order to determine the phonemic representation of text.

The example method may also include identifying one or more finite-state machines ("FSMs") that correspond to a current phoneme of one of the one or more linguistic targets. In one aspect, an FSM may be a compressed recorded speech unit that simulates a Hidden Markov Model ("HMM"). Those of skill in the art will understand that an HMM is a statistical model that may be used to determine state information for a Markov Process when the states of the process are not observable. A Markov Process undergoes successive transitions from one state to another, with the previous and next states of the process depending, to some measurable degree, on the current state. In the context of speech synthesis, in the HMM training process, speech parameters such as spectral envelopes are extracted from speech waveforms (as described above) and then their time sequences are modeled as context-dependent HMMs.

An FSM may differ from an HMM in that a given FSM is based on a single recorded speech unit as opposed to being estimated from a corpus of recorded speech units. In this regard, a given FSM may include information for substantially reproducing an associated recorded speech unit. Since an FSM simulates an HMM, a synthetic speech generator may substantially reproduce a recorded speech unit directly from the FSM in the same manner in which a synthetic speech signal would be generated from an HMM. Thus, generating synthetic speech using one or more FSMs may result in higher quality synthetic speech as compared to a TTS system only using HMMs. Additionally, a plurality of FSMs may require less data storage space than a corpus of recorded speech units, thereby providing more flexibility in the implementation of the hybrid TTS system. In another example, an FSM may be trained using a forced-Viterbi algorithm using L recorded speech units included in a corpus of recorded speech units, where L is an integer significantly less than that the number of recorded speech units included in the corpus. For instance, L may be an integer between 1 and 10. In contrast, an HMM may be trained using the entire corpus of recorded speech units.

The example method may include identifying one or more FSMs corresponding to a current phoneme of one of the one or more linguistic targets. Each FSM in a plurality of FSMs may be mapped to a current phoneme. For each linguistic target, a computing system may identify one or more FSMs that are mapped to the current phoneme of the linguistic target. The example method may further include determining one or more possible sequences of synthetic speech models based on the phonemic representation of text. As used herein, the term "synthetic speech model" may refer to a mathematical model that may be used to generate synthetic speech, such as an FSM or an HMM. Each possible sequence may include a model that corresponds to one of the linguistic targets. One or more models may be joined or concatenated together to form the possible sequence. Each of the one or more possible sequences may include at least one FSM. In some examples, the one or more possible sequences may include other synthetic speech models, such as HMMs.

The example method may include determining a selected sequence that minimizes a cost function. The cost function may indicate a likelihood that a possible sequence of models substantially matches the phonemic representation of the text. The example method may additionally include generating, by a computing system having a processor and a data storage, a synthetic speech signal based on the selected sequence. Minimizing the cost function may result in the selected sequence being an accurate sequence of one or more phonemes used in speaking the text. The synthetic speech signal may include one or more spectral features generated from at least one FSM included in the selected sequence. The computing system may output the synthetic speech signal, or cause to be output, via an audio output device, such as a speaker.

In some examples, the methods, devices, and systems described herein can be implemented using client devices and/or so-called "cloud-based" server devices. Under various aspects of this paradigm, client devices, such as mobile phones, tablet computers, and/or desktop computers, may offload some processing and storage functions to remote server devices. These client services may communicate with the server devices via a network such as the Internet. As a result, applications that operate on the client devices may also have a persistent, server-based component. Nonetheless, it should be noted that at least some of the methods, processes, and techniques disclosed herein may be able to operate entirely on a client device or a server device.

Furthermore, the "server devices" described herein may not necessarily be associated with a client/server architecture, and therefore may also be referred to as "computing systems." Similarly, the "client devices" described herein also may not necessarily be associated with a client/server architecture, and therefore may be interchangeably referred to as "user devices." In some contexts, "client devices" may also be referred to as "computing systems."

FIG. 1 is a simplified block diagram of a communication system 100, in which various embodiments described herein can be employed. Communication system 100 includes client devices 102, 104, and 106, which represent a desktop personal computer (PC), a tablet computer, and a mobile phone, respectively. Each of these client devices may be able to communicate with other devices via a network 108 through the use of wireline connections (designated by solid lines) and/or wireless connections (designated by dashed lines).

Network 108 may be, for example, the Internet, or some other form of public or private Internet Protocol (IP) network.

Thus, client devices 102, 104, and 106 may communicate using packet-switching technologies. Nonetheless, network 108 may also incorporate at least some circuit-switching technologies, and client devices 102, 104, and 106 may communicate via circuit switching alternatively or in addition to packet switching. Further, network 108 may take other forms as well.

Server device 110 may also communicate via network 108. Particularly, server device 110 may communicate with client devices 102, 104, and 106 according to one or more network protocols and/or application-level protocols to facilitate the use of network-based or cloud-based computing on these client devices. Server device 110 may include integrated data storage (e.g., memory, disk drives, etc.) and may also be able to access separate server data storage 112. Communication between server device 110 and server data storage 112 may be direct, via network 108, or both direct and via network 108 as illustrated in FIG. 1. Server data storage 112 may store application data that is used to facilitate the operations of applications performed by client devices 102, 104, and 106 and server device 110.

Although only three client devices, one server device, and one server data storage are shown in FIG. 1, communication system 100 may include any number of each of these components. For instance, communication system 100 may include millions of client devices, thousands of server devices, and/or thousands of server data storages. Furthermore, client devices may take on forms other than those shown in FIG. 1.

Figure 2A:
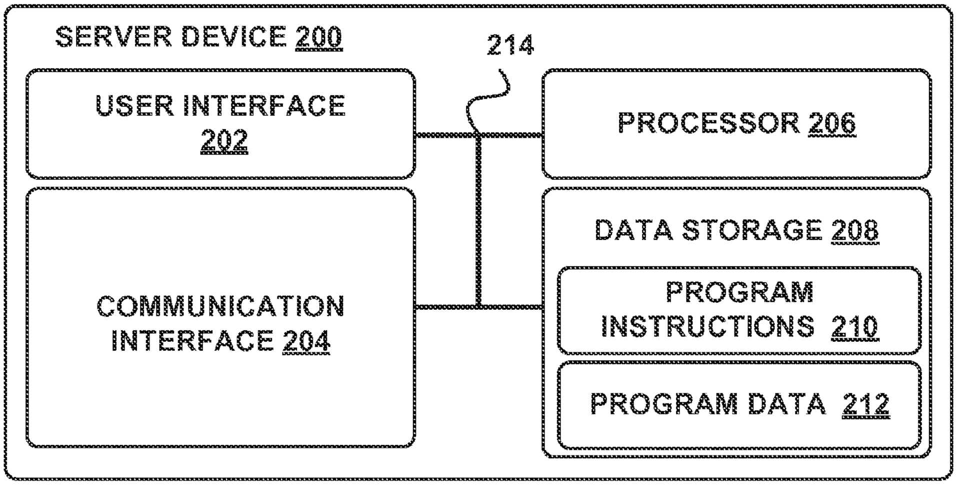
FIG. 2A is a block diagram of an example server device.

FIG. 2A is a block diagram of a server device in accordance with an example embodiment. In particular, server device 200 shown in FIG. 2A can be configured to perform one or more functions of server device 110 and/or server data storage 112. Server device 200 may include a user interface 202, a communication interface 204, processor 206, and/or data storage 208, all of which may be linked together via a system bus, network, or other connection mechanism 214.

User interface 202 may include user input devices such as a keyboard, a keypad, a touch screen, a computer mouse, a track ball, a joystick, and/or other similar devices, now known or later developed. User interface 202 may also include user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 may be configured to generate audible output(s), via a speaker, speaker jack, audio output port, audio output device, earphones, and/or other similar devices, now known or later developed. In some embodiments, user interface 202 may include software, circuitry, or another form of logic that can transmit data to and/or receive data from external user input/output devices.

Communication interface 204 may include one or more wireless interfaces and/or wireline interfaces that are configurable to communicate via a network, such as network 108 shown in FIG. 1. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network. Other examples of wireless and wireline interfaces may exist as well.

Processor 206 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 may be configured to execute computer-readable program instructions 210 that are contained in data storage 208, and/or other instructions, to carry out various functions described herein.

Thus, data storage 208 may include one or more non-transitory computer-readable storage media that can be read or accessed by processor 206. The one or more computer-readable storage media may include volatile and/or non-volatile storage components, such as optical, magnetic, organic or other memory or disc storage, which can be integrated in whole or in part with processor 206. In some embodiments, data storage 208 may be implemented using a single physical device (e.g., one optical, magnetic, organic or other memory or disc storage unit), while in other embodiments, data storage 208 may be implemented using two or more physical devices.

Data storage 208 may also include program data 212 that can be used by processor 206 to carry out functions described herein. In some embodiments, data storage 208 may include, or have access to, additional data storage components or devices (e.g., cluster data storages described below).

Server device 110 and server data storage device 112 may store applications and application data at one or more places accessible via network 108. These places may be data centers containing numerous servers and storage devices. The exact physical location, connectivity, and configuration of server device 110 and server data storage device 112 may be unknown and/or unimportant to client devices. Accordingly, server device 110 and server data storage device 112 may be referred to as "cloud-based" devices that are housed at various remote locations. One possible advantage of such "cloud-based" computing is to offload processing and data storage from client devices, thereby simplifying the design and requirements of these client devices.

In some embodiments, server device 110 and server data storage device 112 may be a single computing system residing in a single data center. In other embodiments, server device 110 and server data storage device 112 may include multiple computing systems in a data center, or even multiple computing systems in multiple data centers, where the data centers are located in diverse geographic locations. For example, FIG. 1 depicts each of server device 110 and server data storage device 112 potentially residing in a different physical location.

Figure 2B:
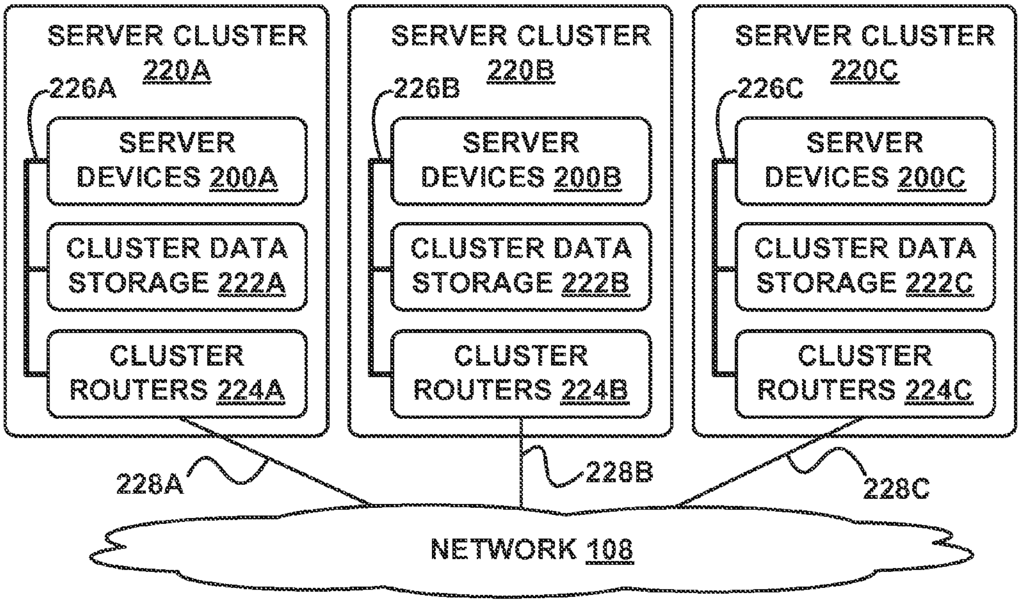
FIG. 2B is a block diagram of an example cloud-based server system.

FIG. 2B depicts a cloud-based server cluster in accordance with an example embodiment. In FIG. 2B, functions of server device 110 and server data storage device 112 may be distributed among three server clusters 220A, 220B, and 220C. Server cluster 220A may include one or more server devices 200A, cluster data storage 222A, and cluster routers 224A connected by a local cluster network 226A. Similarly, server cluster 220B may include one or more server devices 200B, cluster data storage 222B, and cluster routers 224B connected by a local cluster network 226B. Likewise, server cluster 220C may include one or more server devices 200C, cluster data storage 222C, and cluster routers 224C connected by a local cluster network 226C. Server clusters 220A, 220B, and 220C may communicate with network 108 via communication links 228A, 228B, and 228C, respectively.

In some embodiments, each of the server clusters 220A, 220B, and 220C may have an equal number of server devices, an equal number of cluster data storages, and an equal number of cluster routers. In other embodiments, however, some or all of the server clusters 220A, 220B, and 220C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 220A, for example, server devices 200A can be configured to perform various computing tasks of server device 110. In one embodiment, these computing tasks can be distributed among one or more of server devices 200A. Server devices 200B and 200C in server clusters 220B and 220C may be configured the same or similarly to server devices 200A in server cluster 220A. On the other hand, in some embodiments, server devices 200A, 200B, and 200C each may be configured to perform different functions. For example, server devices 200A may be configured to perform one or more functions of server device 110, and server devices 200B and server device 200C may be configured to perform functions of one or more other server devices. Similarly, the functions of server data storage device 112 can be dedicated to a single server cluster, or spread across multiple server clusters.

Cluster data storages 222A, 222B, and 222C of the server clusters 220A, 220B, and 220C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 110 and server data storage device 112 can be distributed across server clusters 220A, 220B, and 220C, various active portions and/or backup/redundant portions of these components can be distributed across cluster data storages 222A, 222B, and 222C. For example, some cluster data storages 222A, 222B, and 222C may be configured to store backup versions of data stored in other cluster data storages 222A, 222B, and 222C.

Cluster routers 224A, 224B, and 224C in server clusters 220A, 220B, and 220C, respectively, may include networking equipment configured to provide internal and external communications for the server clusters. For example, cluster routers 224A in server cluster 220A may include one or more packet-switching and/or routing devices configured to provide (i) network communications between server devices 200A and cluster data storage 222A via cluster network 226A, and/or (ii) network communications between the server cluster 220A and other devices via communication link 228A to network 108. Cluster routers 224B and 224C may include network equipment similar to cluster routers 224A, and cluster routers 224B and 224C may perform networking functions for server clusters 220B and 220C that cluster routers 224A perform for server cluster 220A.

Additionally, the configuration of cluster routers 224A, 224B, and 224C can be based at least in part on the data communication requirements of the server devices and cluster storage arrays, the data communications capabilities of the network equipment in the cluster routers 224A, 224B, and 224C, the latency and throughput of the local cluster networks 226A, 226B, 226C, the latency, throughput, and cost of the wide area network connections 228A, 228B, and 228C, and/or other factors that may contribute to the cost, speed, fault-tolerance, resiliency, efficiency and/or other design goals of the system architecture.

Figure 3:
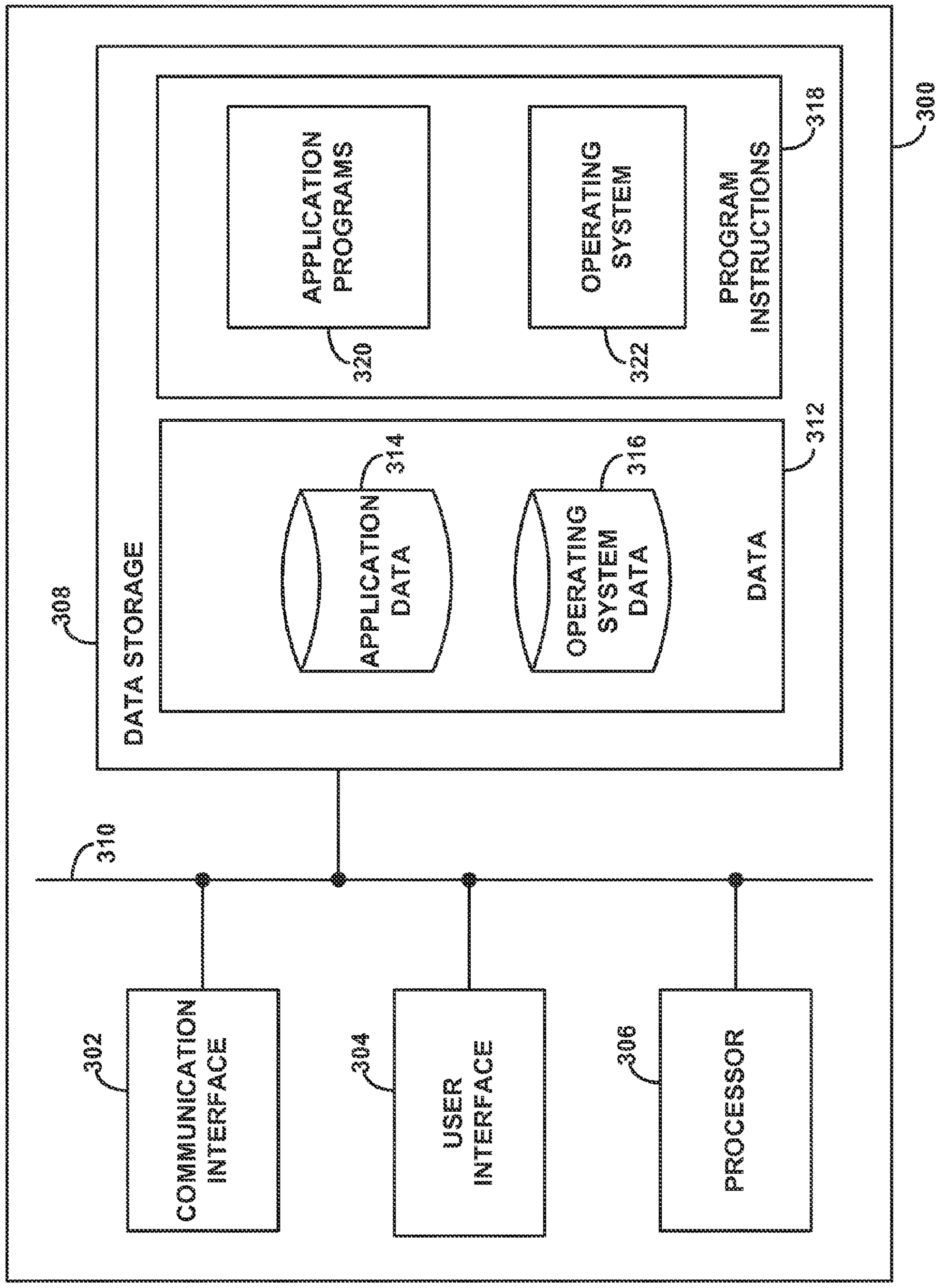
FIG. 3 is a block diagram of an example client device.

FIG. 3 is a simplified block diagram showing some of the components of an example client device 300. By way of example and without limitation, client device 300 may be or include a "plain old telephone system" (POTS) telephone, a cellular mobile telephone, a still camera, a video camera, a fax machine, an answering machine, a computer (such as a desktop, notebook, or tablet computer), a personal digital assistant (PDA), a home automation component, a digital video recorder (DVR), a digital TV, a remote control, or some other type of device equipped with one or more wireless or wired communication interfaces.

As shown in FIG. 3, client device 300 may include a communication interface 302, a user interface 304, a processor 306, and data storage 308, all of which may be communicatively linked together by a system bus, network, or other connection mechanism 310.

Communication interface 302 functions to allow client device 300 to communicate, using analog or digital modulation, with other devices, access networks, and/or transport networks. Thus, communication interface 302 may facilitate circuit-switched and/or packet-switched communication, such as POTS communication and/or IP or other packetized communication. For instance, communication interface 302 may include a chipset and antenna arranged for wireless communication with a radio access network or an access point. Also, communication interface 302 may take the form of a wireline interface, such as an Ethernet, Token Ring, or USB port. Communication interface 302 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 302. Furthermore, communication interface 302 may include multiple physical communication interfaces (e.g., a Wifi interface, a BLUETOOTH® interface, and a wide-area wireless interface).

User interface 304 may function to allow client device 300 to interact with a human or non-human user, such as to receive input from a user and to provide output to the user. Thus, user interface 304 may include input components such as a keypad, keyboard, touch-sensitive or presence-sensitive panel, computer mouse, trackball, joystick, microphone, still camera and/or video camera. User interface 304 may also include one or more output components such as a display screen (which, for example, may be combined with a presence-sensitive panel), CRT, LCD, LED, a display using DLP technology, printer, light bulb, and/or other similar devices, now known or later developed. User interface 304 may also be configured to generate audible output(s), via a speaker, speaker jack, audio output port, audio output device, earphones, and/or other similar devices, now known or later developed. In some embodiments, user interface 304 may include software, circuitry, or another form of logic that can transmit data to and/or receive data from external user input/output devices. Additionally or alternatively, client device 300 may support remote access from another device, via communication interface 302 or via another physical interface (not shown).

Processor 306 may include one or more general purpose processors (e.g., microprocessors) and/or one or more special purpose processors (e.g., DSPs, GPUs, FPUs, network processors, or ASICs). Data storage 308 may include one or more volatile and/or non-volatile storage components, such as magnetic, optical, flash, or organic storage, and may be integrated in whole or in part with processor 306. Data storage 308 may include removable and/or non-removable components.

Processor 306 may be capable of executing program instructions 318 (e.g., compiled or non-compiled program logic and/or machine code) stored in data storage 308 to carry out the various functions described herein. Therefore, data storage 308 may include a non-transitory computer-readable medium, having stored thereon program instructions that, upon execution by client device 300, cause client device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., address book, email, web browsing, social networking, and/or gaming applications) installed on client device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible to or hidden from a user of client device 300.

Application programs 320 may communicate with operating system 322 through one or more application programming interfaces (APIs). These APIs may facilitate, for instance, application programs 320 reading and/or writing application data 314, transmitting or receiving information via communication interface 302, receiving or displaying information on user interface 304, and so on.

In some vernaculars, application programs 320 may be referred to as "apps" for short. Additionally, application programs 320 may be downloadable to client device 300 through one or more online application stores or application markets. However, application programs can also be installed on client device 300 in other ways, such as via a web browser or through a physical interface (e.g., a USB port) on client device 300.

Figure 4A:
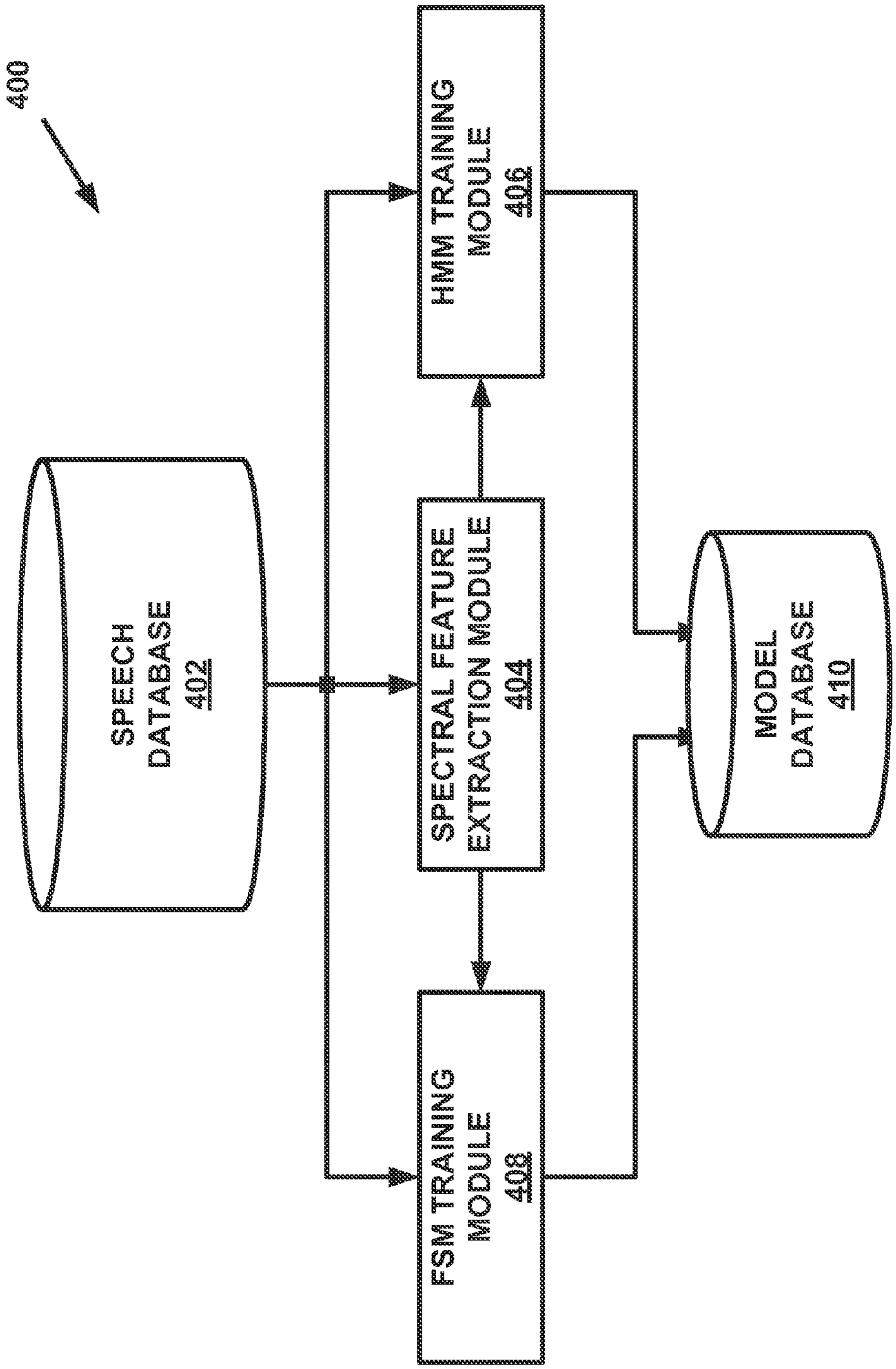
FIG. 4A is a block diagram of an example hybrid TTS training systems.

FIG. 4A depicts an example hybrid TTS training system 400. The hybrid TTS training system 400 may include one or more modules configured to perform operations suitable for generating a plurality of models of speech that are suitable for generating a synthetic speech signal. The hybrid TTS training system 400 may include a speech database 402, a spectral feature extraction module 404, an HMM training module 406, an FSM training module 408, and a model database 410. While the hybrid TTS training system 400 is described as having multiple modules, a single computing system may include hardware and/or software necessary for implementing the hybrid TTS training system 400. Alternatively, one or more computing system connected to a network, such as the network 100 described with respect to FIG. 1, may implement the hybrid TTS training system 400.

The corpus of recorded speech 402 may generally be any suitable corpus of recorded speech units and corresponding text transcriptions. Each recorded speech unit may include an audio file, and a corresponding text transcription may include text of the words spoken in the audio file. The recorded speech units may be "read speech" speech samples that include, for example, book excerpts, broadcast news, list of words, and/or sequence of numbers, among other examples. The recorded speech units may also include "spontaneous speech" speech samples that include, for example, dialogs between two or more people, narratives such as a person telling a story, map-tasks such as one person explaining a route on a map to another, and/or appointment tasks such as two people trying to find a common meeting time based on individual schedules, among other examples. Other types of recorded speech units may also be included in the speech database 402.

The spectral feature extraction module 404 may be configured to identify one or more spectral features for each recorded speech unit included in the speech database 402. The spectral feature extraction module 404 may determine a spectral envelope for each of a given recorded speech unit. The spectral feature extraction module 404 may then determine one or more spectral features of the given recorded speech unit from the spectral envelope. In one example, the one or more spectral features may include one or more Mel-Cepstral Coefficients ("MCCs"). The one or more MCCs may represent the short-term power spectrum of a portion of the waveform to be synthesized from the given training-time predicted feature vector, and may be based on, for example, a linear Fourier transform of a log power spectrum on a non-linear Mel scale of frequency. (A Mel scale may be a scale of pitches subjectively perceived by listeners to be about equally distant from one another, even though the actual frequencies of these pitches are not equally distant from one another.) In another example, the spectral feature extraction module 404 may determine one or more other types of spectral features, such as a fundamental frequency, Line Spectral pairs, Linear Predictive coefficients, Mel-Generalized Cepstral Coefficients, aperiodic measures, log power spectrum, and/or phase.

The spectral feature extraction module 404 may send the one or more spectral features for each recorded unit to the HMM training module 406 and the FSM generation module 408. The HMM training module 406 may train a plurality of HMMs based on the one or more spectral features of the recorded speech units included in the speech database 402. The HMM training module 406 may also generate one or more decision trees for determining an HMM that corresponds to a phonemic representation of text, such as a linguistic target. A number of decision trees may depend on the number of states of the trained HMMs. That is, the HMM training module 406 may determine a decision tree for each state of the trained HMMs. The HMM training module 406 may use the text transcriptions corresponding to the recorded speech units in order to generate the one or more decision trees. The HMM training module 406 may store the decision tree in the model database 410.

The FSM generation module 408 may generate a plurality of FSMs based on the one or more spectral received from the spectral feature extraction module 404 for each recorded speech. The FSM generation module 408 may map each FSM in the plurality of FSMs to a phonemic representation of text. In one example, the FSM generation module 408 may be configured to reduce the number of FSM included in the plurality of FSMs, perhaps by removing similar FSMs corresponding to a same phonemic representation of text. Once a final plurality of FSMs is determined, the FSM generation module 408 may store the final plurality of FSM in the model database 410.

Thus, the hybrid TTS training system may generate a model database 410 that includes a plurality of HMMs, each associated with a phonemic representation of text; a plurality of FSMs, each associated with a phonemic representation of text, and a decision tree for mapping a phonemic representation of text to a given HMM.

Figure 4B:
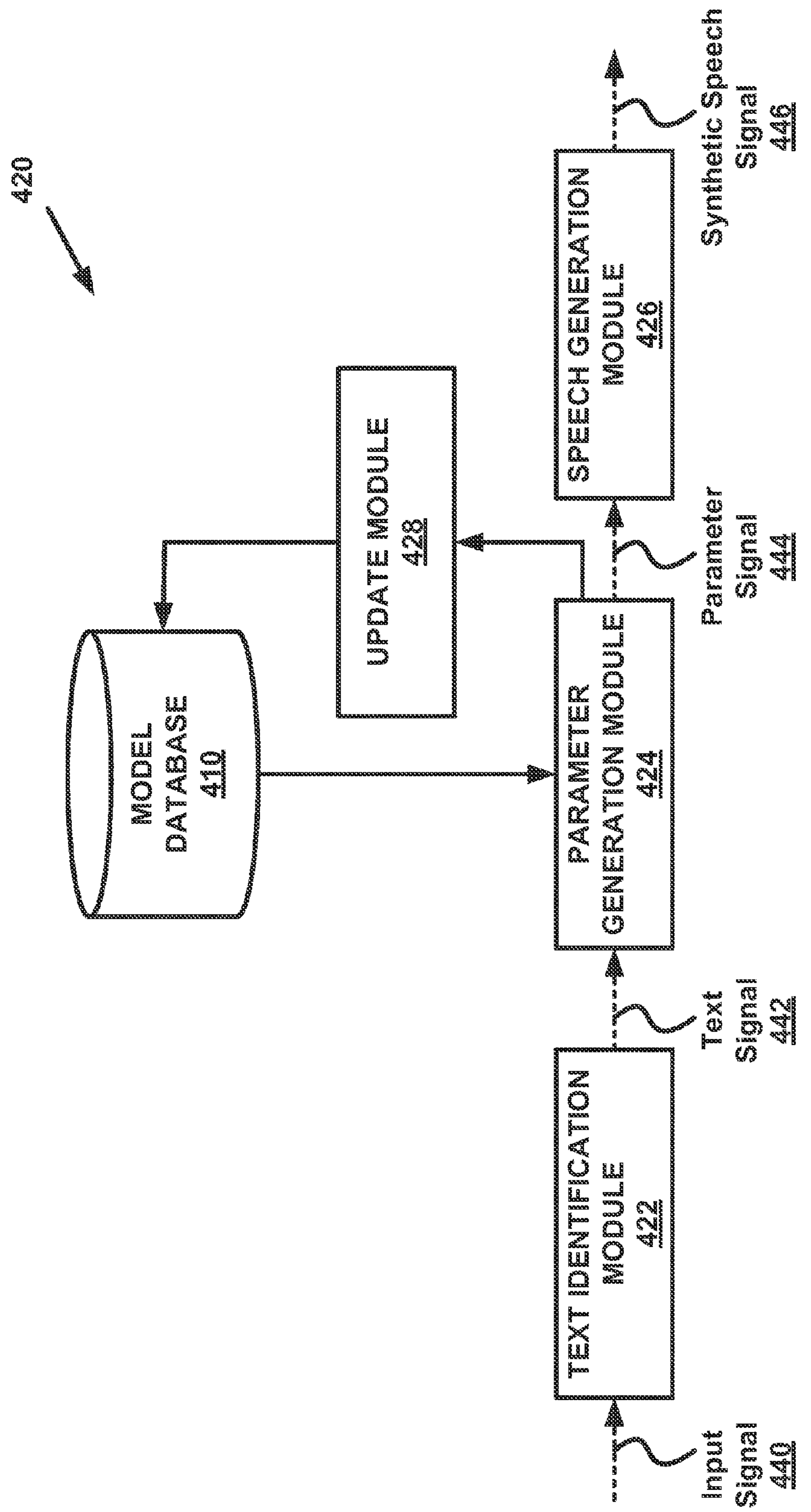
FIG. 4B is a block diagram of an example hybrid TTS synthesis system.

FIG. 4B is an example hybrid TTS synthesis system 420. The hybrid TTS synthesis system 420 may generate a synthetic speech signal using a hybrid TTS database, such as the model database 410 described with respect to FIG. 4A. The hybrid TTS synthesis system 420 may include the model database 410, a text identification module 422, a parameter generation module 424, a filtering module 426, an update module 428, and a speech generation module 430.

The text identification module 422 may receive an input signal 440 that includes information indicative of text. The text identification module 422 may then determine a phonemic representation of text based on the input signal 440, and may send the phonemic representation of text to the parameter generation module 424 in a text signal 442. The text identification module 422 may receive the input signal 440, which may include information indicative of text. The information indicative of the text may include a single word, or the text may include a text string. In one example, the text identification module 422 receives the input signal 440 from an input interface component, such as a keyboard, touchscreen, or any other input device suitable for inputting text. In another example, the text identification module 422 may receive the input signal from a remote computing system, perhaps via a network, such as the network 100 described with respect to FIG. 1.

The parameter generation module 424 may determine one or more possible sequences of synthetic speech models based on the phonemic representation of text included in the text signal 442. The parameter generation module 424 may then determine a selected sequence that substantially matches the phonemic representation of text. The selected sequence may include at least one FSMs selected from the plurality of FSMs that is stored in the model database 410. In one example, the selected sequence may also include one or more HMMs selected from the plurality of HMMs that is stored in the model database 410. The parameter generation module 424 may then determine one or more spectral features to include a parameter signal 444 based on the synthetic speech models included in the selected sequence.

The parameter generation module 424 may send the parameter signal 444 to the speech synthesizer 426. The speech synthesizer 426 may generate a synthetic speech signal 446 based on the one or more parameters included in parameter signal 444. The synthetic speech signal 446 may cause an audio output device to output synthetic speech of the text 420. Accordingly, the speech synthesizer 426 may then send the synthetic speech signal 446 to an audio output device, such as a speaker.

In one example, the update module 428 may be configured to update an HMM included in the selected sequence. The update module 428 may use one or more FSMs included to update the HMM. The update module 428 may receive the sequence of models from the parameter generation module 424 and determine whether the sequence of models includes an HMM. Upon determining that the selected sequence includes one or more HMMs, the update module 428 may update the one or more HMMs using one or more similar FSMs. This may result in the one or more HMMs being capable of generating more one or more spectral features that result in synthetic speech that sounds more natural.

Figure 5:
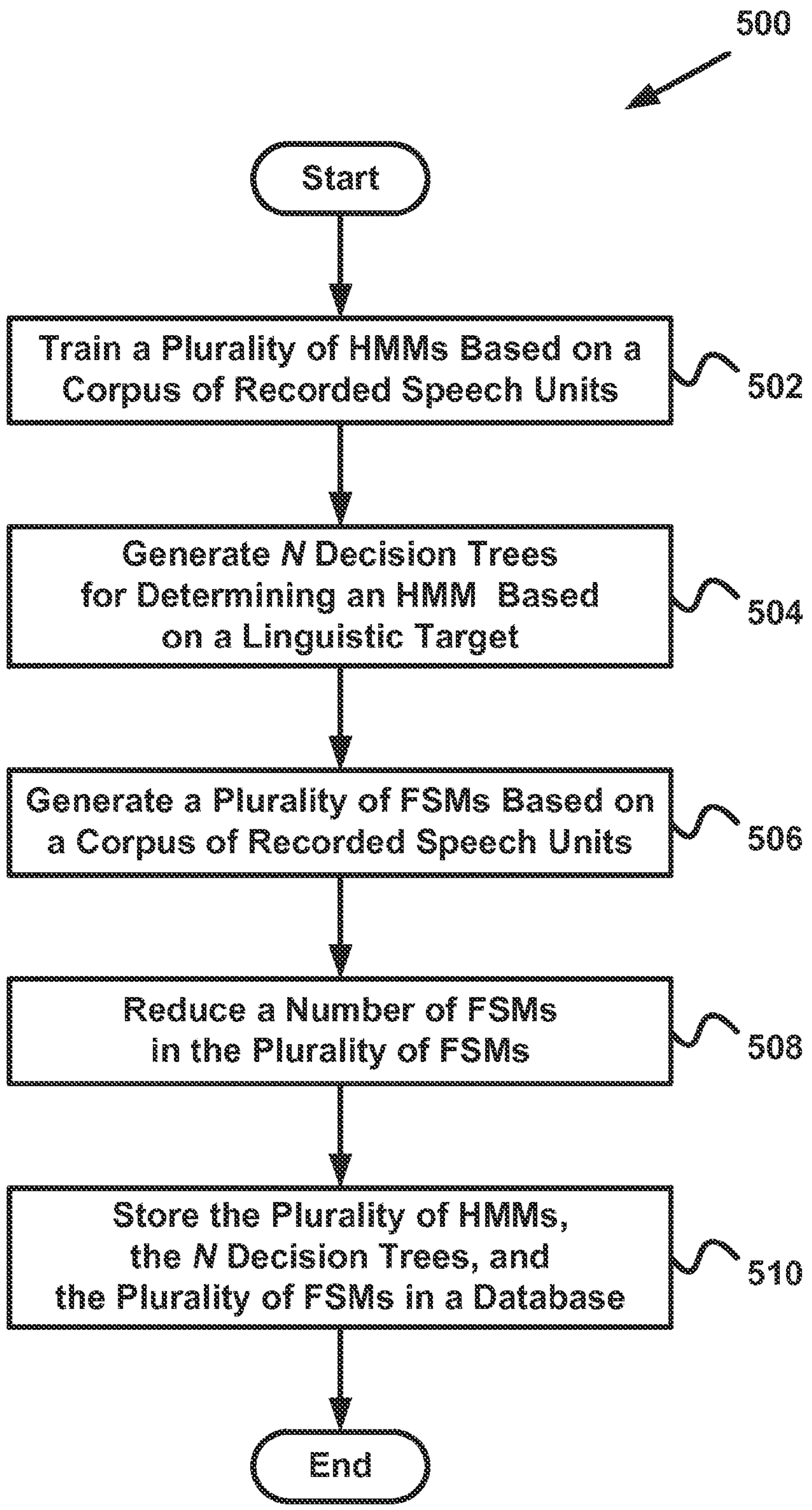
FIG. 5 is a flow diagram of an example method for training a hybrid TTS system.

FIG. 5 is a flow diagram of a method 500. A computing system, such as the server device 200, one of the server clusters 220A-220C, or the client device 300, may implement one or more steps of the method 500 to generate a model database configured for use in a hybrid TTS synthesis system, such as the model database 410 described with respect to FIGS. 4A and 4B. Alternatively, the steps of the method 500 may be implemented by multiple computing systems connected to a network, such as the network 100 described with respect to FIG. 1. For purposes of example and explanation, the method 500 is described as being implemented by the hybrid TTS training system 400 described with respect to FIG. 4A. Functions described in blocks of the flowchart may be provided as instructions stored on computer readable medium (non-transitory media) that can be executed by a computing system to perform the functions.

At block 502, the method 500 includes training a plurality of HMMs based on a corpus of recorded speech units. As previously described, the spectral feature extraction module 404 may send one or more spectral features for each recorded speech unit in the corpus of recorded speech units to the HMM training module 406. The HMM training module 406 may train a plurality of HMMs based on the one or more spectral features received from the spectral feature extraction module 404.

Each HMM in the plurality of HMMs may include N states, where N is an integer greater than zero. In one example, N may be equal to five, though in other examples N may be greater or less than five. Each of the N states may be based on a multi-mixture Gaussian density function that estimates one or more spectral features of speech corresponding to a given phonemic representation of text. Each multi-mixture Gaussian density function may be based on the one or more spectral features received from the spectral feature extraction module 404 for M similar recorded speech units, where M is a positive integer. In this example, the multi-mixture Gaussian density function $b_j(o_t)$ may be given by the following equation:

$$b_j(o_t) = \sum_{k=1}^{M} c_{jk} \frac{1}{(2\pi)^{\frac{D}{2}} |\Sigma_{jk}|^{\frac{1}{2}}} \exp\left\{-\frac{1}{2}(o_t - \mu_{jk})^T \Sigma_{jk}^{-1} (o_t - \mu_{jk})\right\} \quad (1)$$

where $o_t$ is a D-dimensional observation vector based on the one or more spectral components, and $c_{jk}$, $\mu_{jk}$, and $\Sigma_{jk}$ are the mixture coefficient, D-dimensional mean vector, and D×D covariance matrix for the $k^{th}$ mixture in the $j^{th}$ state, respectively. Other means of determining a state of an HMM may also be possible.

At block 504, the method 500 includes generating N decision tree for determining an HMM based on a linguistic target. As previously described, the HMM training module 406 may generate the N decision trees for determining an HMM that corresponds to a phonemic representation of text, such as a linguistic target. The HMM training module 406 may receive the text transcriptions corresponding to each recorded speech unit from the speech database 402. In one example, the HMM training module 406 may generate the N decision trees using a forced-Viterbi algorithm. In another example, the HMM training module may generate the decision tree using any algorithm, method, and/or process suitable for generating a decision tree for an HMM.

At block 506, the method 500 includes generating a plurality of FSMs based on the corpus of recorded speech units. The FSM generation module 408 may also receive the one or more spectral features corresponding to each recorded unit included in the corpus of recorded speech units 402 from the spectral feature extraction module 404. The FSM generation module 408 may generate the plurality of FSMs based on the one or more spectral features for each recorded speech unit.

Figure 6:
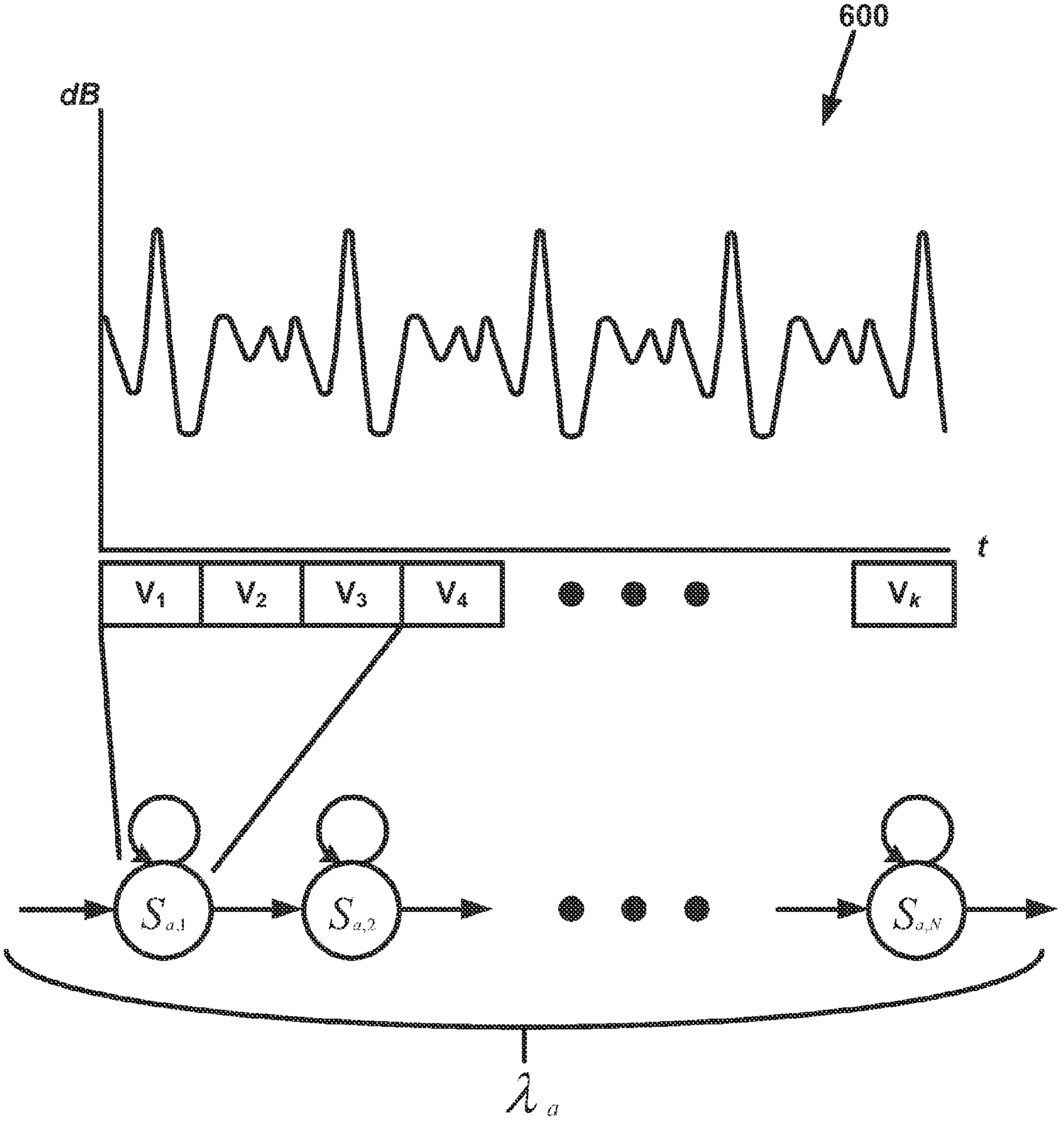
FIG. 6 illustrate an example FSM generated from a recorded speech unit.

FIG. 6 illustrate an example of an FSM $\lambda_a$ generated from a recorded speech unit 600. The recorded speech unit 600 may be a portion of an audio signal that includes a phoneme. The FSM generation module 408 may determine k vectors, where k is an integer greater than zero and vector $v_i$ is the $i^{th}$ vector. Each vector $v_1$-$v_k$ may include information indicative of one or more spectral features of the recorded speech unit 600 over a period of time. As previously described, the one or more spectral features may include one or more MCCs, and, in some situations, one or more additional spectral features suitable for generating synthetic speech.

Once each of the vectors $v_1$-$v_k$ is determined, the FSM generation module 408 may align one or more vectors into one of the N states $S_{a,j}$ of the FSM, where $S_{a,j}$ is the $j^{th}$ state of the FSM $\lambda_a$. The FSM generation module 408 may determine a mean and variance for the $j^{th}$ state based on the one or more vector aligned to the $i^h$ state. The means and variances of states $S_{a,1}$-$S_{a,N}$ can then be used to estimate the multi-mixture Gaussian density function of equation (1) for the FSM $\lambda_a$, allowing the FSM $\lambda_a$, to simulate an HMM.

Returning to FIG. 5, the FSM generation module 408 may associate each FSM in the plurality of FSMs with a phonemic representation of text. The FSM generation module 408 may associate each FSM with a phonemic representation of text. To this end, the FSM generation module 408 may use any algorithm, method, and/or process now known or later developed that is suitable for associating each FSM with a phonemic representation of text.

At block 508, the method 500 includes reducing a number of FSMs included in the plurality of FSMs. Because the spectral features of each FSM are averaged over N states, the amount of space need to store the plurality of FSMs in an electronic database may be less than the amount of data needed to store the speech database 402. However, depending on the amount of available space in the model database 410 in which to store the plurality of FSMs, the FSM generation module 408 may reduce the number of FSMs included in the plurality of FSMs that is stored in the model database 410.

Since each FSM is based on a recorded speech unit, some FSMs corresponding to a same phonemic representation of text may be similar. The FSM generation module 408 may reduce the number of FSMs included in the plurality of FSMs by removing a number of similar FSMs from the plurality of FSMs. For instance, the FSM generation module 408 may determine a Kullback-Leibler distance for one or more FSMs corresponding to a same phonemic representation of text. The Kullback-Leibler distance $D_{KL}$ from a first FSM $\lambda_1$ to a second FSM $\lambda_2$ may be given by the following equation:

$$D_{KL}(\lambda_1||\lambda_2) = \int_x \ln\left(\frac{d\lambda_1}{d\lambda_2}\right)d\lambda_1 = \int_x \frac{d\lambda_1}{d\lambda_2}\ln\left(\frac{d\lambda_2}{d\lambda_1}\right)d\lambda_2 \tag{2}$$

The FSM generation module 408 may remove one or more FSM having a Kullback-Leibler distance that is less than a threshold. A relative value of the threshold may depend on the size of the data storage device in which the model database 410 is to be stored. In general, a number of FSMs included in the plurality of FSM may be inversely proportional to the threshold. That is, as the threshold increases, the FSM generation module 408 may remove more similar FSMs from the plurality of FSMs. In this example, the FSM generation module 408 may reduce a number of FSMs included in the plurality of FSMs by a factor of X. In another example, the FSM generation module may use any suitable procedure for reducing the number of FSMs included in the plurality of FSMs.

The threshold may depend on a type of computing system in which the model database 410 is to be stored. Varying the threshold may allow the model database 410 to be stored in a variety of computing systems. For instance, if the model database 410 is to be stored in a mobile device, such as the client terminal 300 depicted in FIG. 3, the threshold may be greater as compared to an example in which the model database 410 is to be stored in a device with greater data storage capacity, such as the server device 200 depicted in FIG. 2A.

At block 510, the method 500 includes storing the plurality of HMMs, the N decision trees in a database, and the plurality of FSMs. In one example, the plurality of HMMs, the N decision trees in a database, and the plurality of FSMs are stored in a single database, such as the model database 410. In another example, the plurality of HMMs and the plurality of FSMs may be stored in a first database, and the N decision trees may stored in a second database. In yet another example, the plurality of HMMs, the N decision trees in a database, and the plurality of FSMs may each be stored in a separate database. Upon completion of the steps of block 512, the method 500 may end.

Figure 7:
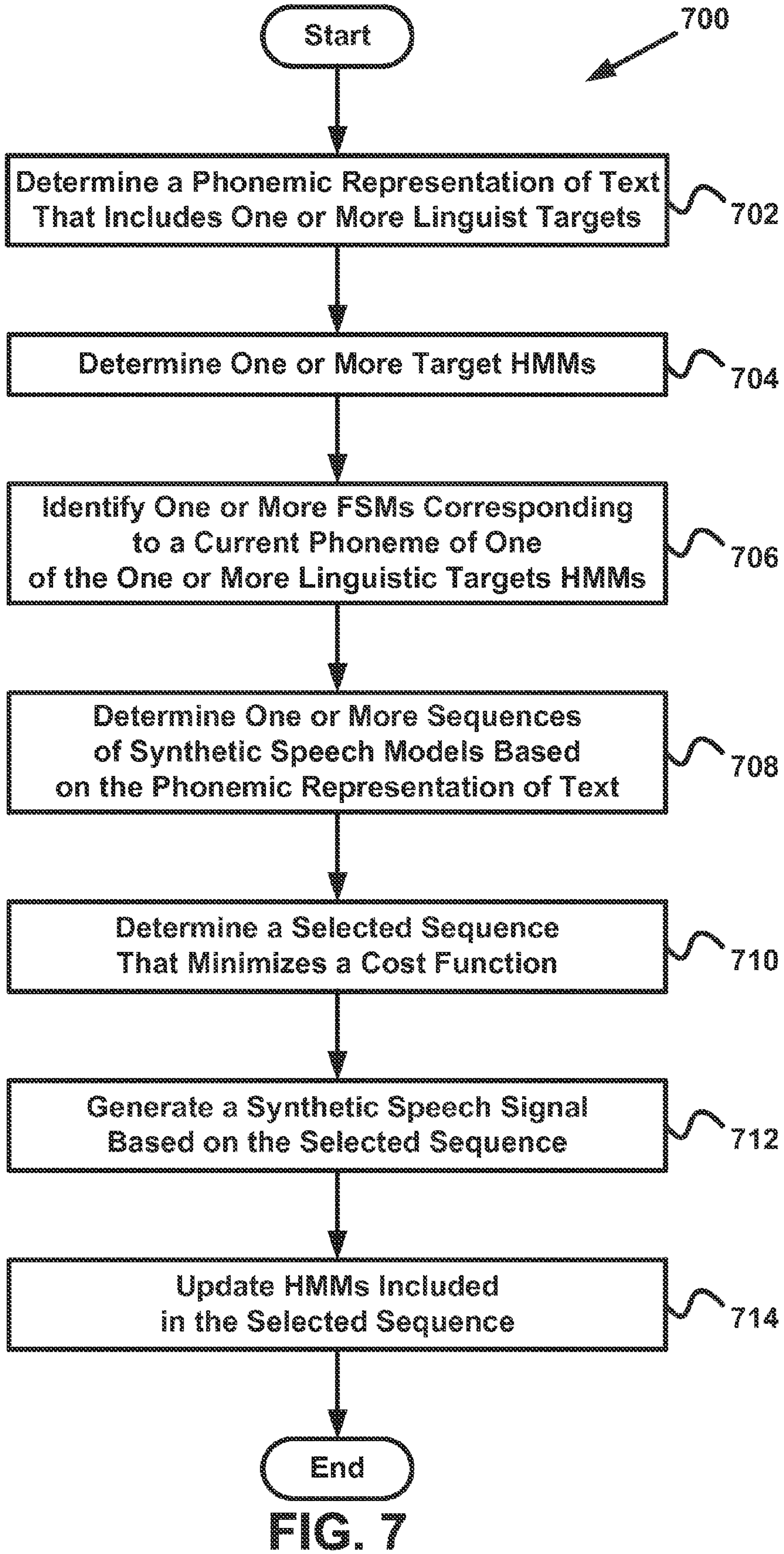
FIG. 7 is a flow diagram of an example method for synthesizing speech using a hybrid TTS system.

FIG. 7 is a flow diagram of a method 700. A computing system, such as the server device 200, one of the server clusters 220A-220C, or the client device 300, may implement one or more steps of the method 700 to generate a synthetic speech signal using a hybrid TTS model database, such as the model database 410 described with respect to FIGS. 4A and 4B. Alternatively, the steps of the method 700 may be implemented by multiple computing systems connected to a network, such as the network 100 described with respect to FIG. 1. For purposes of example and explanation, the method 700 is described as being implemented by the hybrid TTS training system 420 described with respect to FIG. 4B.

At block 702, the method 700 includes determining a phonemic representation of text that includes one or more linguistic targets. The text identification module 422 may determine the phonemic representation of text based on text included in the input signal 440. The phonemic representation of text may include a sequence of one or more linguistic targets. Each of the one or more linguistic targets may include a previous phoneme, a current phoneme, and a next phoneme. Each of the one or more linguistic targets may also include information indicative of one or more additional features, such as phonology details (e.g., the current phoneme is a vowel, is stressed, etc.), syllable boundaries, and the like. The text identification module 422 may employ any algorithm, method, and/or process now known or later developed to determine the phonemic representation of text.

At block 704, the method 700 includes determining one or more target HMMs. The parameter generation module 424 may identify the phonemic representation of text from the text signal 442, and may access the model database 410 to acquire the N decision trees. The parameter generation module 424 may parse each of the linguistic targets through the N decision trees in order to determine a target HMM.

Figure 8A:
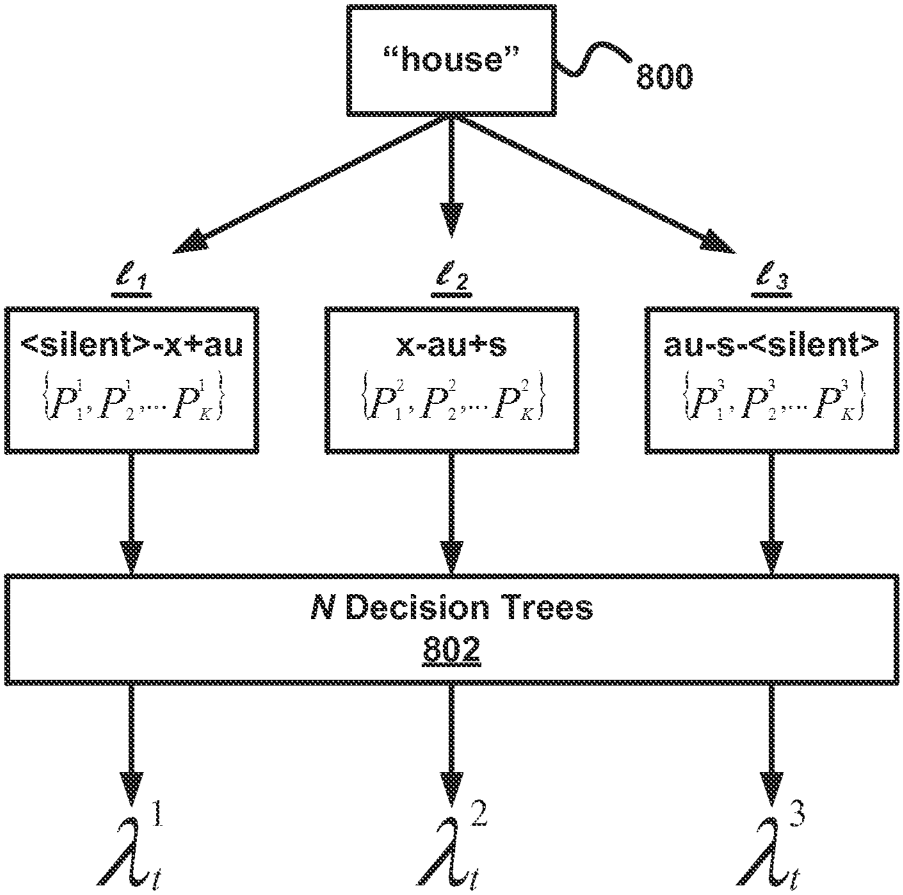
FIG. 8A illustrates an example determination one or more linguistic targets and one or more target HMMs.

FIG. 8A illustrates an example determination of a phonemic representation of text and one or more target HMMs. In this example, the input signal 440 may include the word "house." The text identification module 422 may determine a phonemic representation of "house" includes three linguistic targets $l_1$, $l_2$, $l_3$. Each linguistic target $l_1$-$l_3$ may have a prior phoneme, a current phoneme, and a next phoneme. For example, the second linguistic target $l_2$ may have a prior phoneme "x", a current phoneme "au", and a next phoneme "s". For a linguist target that is the first or last linguistic target in a phonemic representation of a word, a "silent" phoneme may indicate the boundary of the word, as is indicated in the linguistic targets $l_1$ and $l_3$. Additionally, each linguistic target may have a number of features $P_k^i$ that provide contextual information about the linguistic target, where i is the $i^{th}$ linguistic target and k is the $k^{th}$ feature.

The parameter generation module 424 may receive the linguistic targets $l_1$-$l_3$ from the text generation module, and may acquire the N decision trees 802 from the model database 410. The parameter generation module 424 may then parse each of the linguistic targets $l_1$-$l_3$ through the N decision trees 802 to determine three target HMMs $\lambda_t^1$, $\lambda_t^2$, and $\lambda_t^3$.

Returning to FIG. 7, the method 700 may include identifying one or more FSMs included in the plurality of FSMs having a same current phoneme as one of the one or more linguistic targets, at block 706. The parameter generation module 424 may access the model database 410 to identify one or more FSMs corresponding to a current phoneme of one of the one or more linguistic targets. For instance, if a current phoneme of a linguistic target is "au", the parameter generation module 424 may identify each FSM in the plurality of FSMs having "au" as a current phoneme.

At block 710, the method 700 may include determining one or more possible sequences of synthetic speech models based on the phonemic representation of text. The parameter generation module 424 may determine the one or more possible sequences. Each sequence may include a synthetic speech model, such as an FSM or an HMM, corresponding to each linguistic target. For example, if there are three linguistic targets in a phonemic representation of speech, each possible sequence may include a synthetic speech model corresponding to the first linguistic target, a synthetic speech model corresponding to the second linguistic target, and a synthetic speech model corresponding to the third linguistic target.

At block 710, the method 700 may include determining a selected sequence that minimizes the value of a cost function. As previously described, the selected sequence may substantially match the phonemic representation of text. In order to determine the sequence of models, the parameter generation module 424 may minimize a cost function. The "cost" of a possible sequence may be representative of, for instance, a likelihood that the possible sequence substantially matches the phonemic representation of text. In one example, the cost function C(i) for the $i^{th}$ sequence of models be given by the following equation:

$$C(i)=C_{target}(i)+C_{join}(i) \tag{3}$$

where $C_{target}(i)$ is a target cost of the FSMs included in the $i^{th}$ sequence of models, and $C_{join}(i)$ is a join cost for joining the FSMs included in the $i^{th}$ sequence of models.

The target cost may be based on a similarity between an identified FSM and an associated target HMM. That is, the more closely a given FSM matches an associated target HMM, the lower the target cost for the given FSM. In one example, the parameter generation module 424 may determine that the target cost for a given FSM is the Kullack-Leibler distance from the associated target HMM to the given FSM. For instance, a first target HMM $\lambda^{th}$ may correspond to a first linguistic target, and a possible sequence may include an FSM $\lambda_a^1$ corresponding to the first linguistic target. The target cost for the including the FSM $\lambda_a^1$ in the possible sequence may be given by the following equation:

$$C_{target}(\lambda_a^1) = D_{KL}(\lambda_t^1 \| \lambda_a^1) = \int_x \frac{d\lambda_t^1}{d\lambda_a^1} \ln\left(\frac{d\lambda_a^1}{d\lambda_t^1}\right) d\lambda_a^1 \tag{4}$$

The parameter generation module 424 may determine a target cost for each FSM identified at block 708 of the method 700. In another example, the parameter generation module 424 may use a different means for determining the target cost $C_{target}$ for each of the identified FSMs.

Figure 8B:
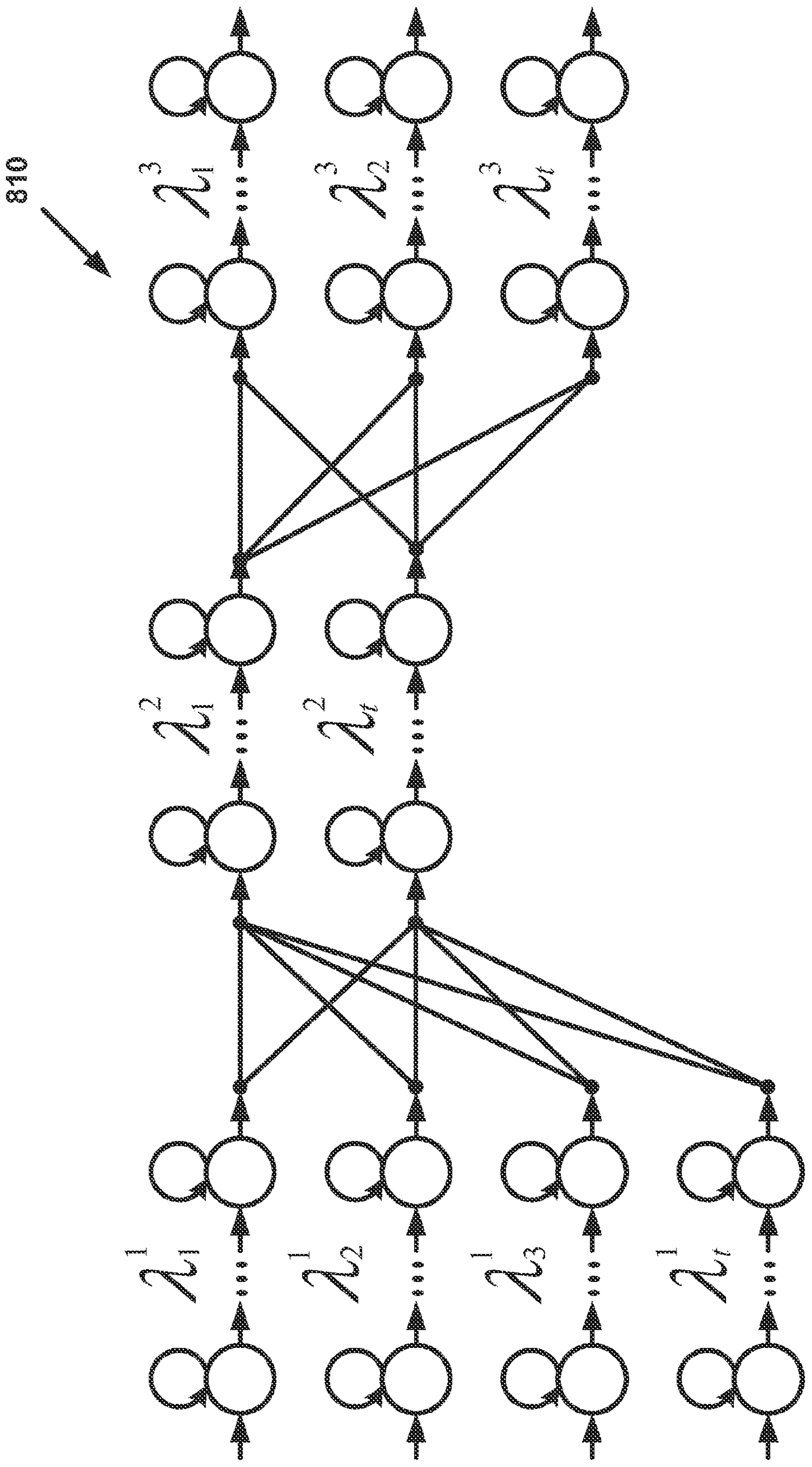
FIG. 8B illustrates an example lattice that a computing system may generate when determining a selected sequence of models.

The join cost $C_{join}$ for a given pair of FSMs may be indicative of a likelihood that the pair of FSMs substantially matches a given segment of the phonemic representation of text 622. In one example the join cost may be determined using a lattice that includes the one or more possible sequences. FIG. 8B illustrates an example lattice 810. The parameter generation module 424 may generate the lattice based 810 in order to determine the one or more possible sequences of models.

In FIG. 8B, the phonemic representation of text may include three linguistic targets. Each column in the lattice may correspond to one of the three linguistic targets, arranged from the left to right. Within each column, the parameter generation module 424 may sort the FSMs from lowest target cost to highest target cost. In this example, three FSMs ($\lambda_1^1$, $\lambda_2^1$, and $\lambda_3^1$) may correspond to the current phoneme of the first linguistic target, one FSM (A) may correspond to the current phoneme of the second linguistic target, and two FSMs ($\lambda_1^3$ and $\lambda_2^3$,) may correspond to the current phoneme of the third linguist target. The parameter generation module 424 may also include target HMMs ($\lambda_t^1$, $\lambda_t^2$, and $\lambda_t^2$) determined from the linguistic targets. In one example, the parameter generation model does not include the target HMMs in the lattice 810. Additionally, the phonemic representation of text may include more or fewer linguistic targets, and the lattice 810 may include more or fewer synthetic speech models for each linguistic target.

Each connection in the lattice 810 may represent a segment of one of the one or more possible sequences determined at block 708 of the method 700. The parameter generation module 604 may determine the join cost by determining a distance between the last state of the $k^{th}$ FSM and the first state of the $k+1^{th}$ FSM. In one example, the parameter generation module 604 may determine the join cost $C_{join}$ determining a Kullack-Leibler distance from a last state $S_N^k$ of the $k^{th}$ FSM in a sequence of models and the first state first $S_1^{k+1}$ of the $k+1^{th}$ FSM. In this example, the join cost may be given by the following equation:

$$C_{join}(\lambda_k, \lambda_{k+1}) = D_{KL}(S_N^k \| S_1^{k+1}) = \int_x \frac{dS_N^k}{dS_1^{k+1}} \ln\left(\frac{dS_1^{k+1}}{dS_N^k}\right) dS_1^{k+1} \tag{5}$$

The parameter generation module 424 may determine a value of the cost function C for each possible combination of models. In another example, the parameter generation module may determine the distance between the last state of the $k^{th}$ FSM and the first state of the $k+1^{th}$ FSM using any algorithm, method and/or process now known or later developed that is suitable for determining the distance between two state-machine models and/or states.

The cost function may also include a penalty cost for including an HMM in the sequence of models. In this example, the cost function C(i) may then be given by the following equation: $C_{penalty}$ $$C(i)=C_{target}(i)+C_{join}(i)+C_{penalty} \tag{6}$$

where $C_{penalty}$ is the penalty cost. The penalty cost may be included to minimize the incidence of including a target HMM in the sequence of models. Additionally, the join cost may minimize the incidence in which successive target HMMs are included in the model sequence.

To determine the selected sequence, the parameter generation module 424 may determine a value for the cost function for each of the one or more possible sequences. In an example in which the parameter generation module 424 includes the target HMMs in the lattice 810, the selected sequence may correspond to the possible sequence that has a minimum value of the cost function (6). In an example in which the target HMMs are not included in the lattice 810, the selected sequence may correspond to the possible sequence that has a minimum value of the cost function (3). The selected sequence may include at least one FSM.

At block 712, the method 700 may include generating a synthetic speech signal based on the selected sequence. After determining the selected sequence, the parameter generation module 424 may generate the parameter signal 444 based on the selected sequence. The parameter signal 444 may include information indicative of the selected sequence. The parameter generation module 424 may send the parameter signal 444 to the speech generation module 426.

In one example, the speech generation module 426 may concatenate the one or more synthetic speech models included in the selected sequence to form a concatenated sequence. The speech generation module 426 may then generate the synthetic speech signal 446 based on the concatenated sequence. The synthetic speech signal 446 may include information indicative of one or more spectral features for each state of each synthetic speech model included in the selected sequence. For instance, the synthetic speech signal 446 may include information indicative of one or more spectral features generated from at least one FSM included in the selected sequence. The speech generation module 426 may send the synthetic speech signal 446 to an audio output device, such as a speaker. Alternatively, the speech generation module 426 may send the synthetic speech signal 446 to another computing system configured to output audio the synthetic speech signal 446 as audio.

At block 714, the method 700 includes updating target HMMs included in the selected sequence of models. The update module 428 may receive the selected sequence from the parameter generation module 424 and determine whether the selected sequence includes an HMMs, such as one of the target HMMs. Upon determining that the selected sequence of models includes a target HMM, the update module 428 may update one or more spectral features estimated by the target HMM. The update may be based on one or more spectral features of one or more FSMs having a same current phoneme as the target HMM.

In one example, the update module 428 updates the target HMM using a transformation matrix. The transformation matrix may include information for updating one or more states of the HMM. For instance, consider an example in which the synthetic speech models have five states. States $S_1$ and $S_5$ may be considered boundary states, and states $S_2$-$S_4$ may be considered central states. The transformation matrix may include an update to one or more central states of the HMM based on one or more central states of one or more FSMs corresponding to the same central phoneme unit as the HMM. The transformation matrix may also include an update for one or more boundary states of the HMM based on a boundary state of one or more FSMs concatenated to the HMM in the selected sequence. For instance, an update to the first state of the HMM may be based on the $N^{th}$ state of an FSM that precedes the HMM in the selected sequence. Similarly, an update to the $N^{th}$ state of the HMM may be based on the first state of an FSM that follows the HMM in the selected sequence. In this manner, the central states of the HMM may be updated with more data than the boundary states. This may result in HMMs that more closely model natural speech.

Upon completion of the steps of block 714, the method 700 may end.

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the flow diagrams, scenarios, and flow charts in the figures and as discussed herein, each step, block, and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks, and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various example aspects and example embodiments have been disclosed herein, other aspects and embodiments will be apparent to those skilled in the art. The various example aspects and example embodiments disclosed herein are for purposes of illustration and are not intended to be limiting, with the true scope being indicated by the following claims.

The invention claimed is:

1. A method comprising:

determining a phonemic representation of text that includes one or more linguistic targets, wherein each of the one or more linguistic targets includes one or more phonemes;

identifying one or more finite-state machines ("FSMs") that correspond to one of the one or more phonemes included in the one or more linguistic targets, wherein each of the one or more FSMs includes a compressed recorded speech unit that simulates a Hidden Markov Model ("HMM") by averaging one or more spectral features of a recorded speech unit over N states, wherein N is a positive integer;

determining one or more possible sequences of synthetic speech models based on the phonemic representation of the text, wherein each of the one or more possible sequences includes at least one FSM;

determining, from the one or more possible sequences of synthetic speech models, a selected sequence that minimizes a value of a cost function, wherein the cost function represents a likelihood that one of the one or more possible sequences substantially matches the phonemic representation of the text; and generating, by a computing system having a processor and a memory, a synthetic speech signal of the text based on the selected sequence, wherein the synthetic speech signal includes information indicative of one or more spectral features generated from at least one FSM included in the selected sequence.

2. The method of claim 1, wherein each of the N states of each FSM is based on a mean and a variance of one or more vectors aligned in a given state, wherein the one or more vectors are indicative of one or more spectral features of a segment of an associated recorded speech unit, and wherein N means and N variances are used to estimate a multi-mixture Gaussian density function in order to simulate an HMM.

3. The method of claim 1, wherein the one or more spectral features include one or more Mel-cepstral coefficients.

4. The method of claim 1, further comprising determining one or more target HMMs that correspond to one of the one or more phonemes included in the one or more linguistic targets, wherein each of the one or more HMMs is trained from a corpus of recorded speech units and estimates one or more spectral features of a corresponding linguistic target over N states.

5. The method of claim 4, wherein the cost function includes a target cost that is indicative of a difference between a current FSM and an associated target HMM, wherein:

the current FSM is one of the one or more FSMs, the associated target HMM is one of the one or more target HMMs, and the current FSM and the associated target HMM correspond to a same phoneme of one of the one more linguistic targets.

6. The method of claim 5, wherein the target cost is a Kullback-Leibler distance from the associated target HMM to the current FSM.

7. The method of claim 4, wherein the cost function includes a join cost for concatenating two successive models, wherein each of the two successive models is one of an FSM or an HMM.

8. The method of claim 7, wherein the $k^{th}$ model is an FSM, and wherein the join cost is a Kullback-Leibler distance from an $N^{th}$ state of a $k^{th}$ model to a first state of a $k+1^{th}$ model.

9. The method of claim 7, wherein the $k^{th}$ model is an HMM, and wherein the join cost from the $k^{th}$ model to the $k+1^{th}$ model is the join cost from the $k-1^{th}$ model to the $k^{th}$ model, wherein the $k-1^{th}$ model is an FSM.

10. The method of claim 4, wherein one of the one or more possible sequences includes one or more FSMs interleaved with one or more HMMs.

11. The method of claim 10, wherein the cost function includes a penalty cost for each of the one or more HMMs.

12. The method of claim 4, further comprising:

determining whether the selected sequence includes an HMM; and in response to determining that the selected sequence includes an HMM, updating the HMM based on one or more FSMs.

13. The method of claim 12, wherein updating the one or more states of the HMM includes determining a transformation matrix based on:

one or more central states of one or more FSMs corresponding to a same phoneme as the HMM; and one or more boundary states of one or more FSMs concatenated to the HMM in the selected sequence, wherein a boundary state of a given FSM is one of a first state or an $N^{th}$ state of the given FSM, and a central state is one or more states of the given FSM other than one of the one or more boundary states.

14. A non-transitory computer-readable memory having stored therein instructions, that when executed by a computing system, cause the computing system to perform functions comprising:

determining a phonemic representation of text that includes one or more linguistic targets, wherein each of the one or more linguistic targets includes one or more phonemes;

identifying one or more finite-state machines ("FSMs") that correspond to one of the one or more phonemes included in the one or more linguistic targets, wherein each of the one or more FSMs is a compressed recorded speech unit that simulates a Hidden Markov Model ("HMM") by averaging one or more spectral features of a recorded speech unit over N states, wherein N is a positive integer;

determining one or more possible sequences of synthetic speech models based on the phonemic representation of the text, wherein each of the one or more possible sequences includes at least one FSM;

determining, from the one or more possible sequences of synthetic speech models, a selected sequence that minimizes a value of a cost function, wherein the cost function represents a likelihood that one of the one or more possible sequences substantially matches the phonemic representation of text; and generating a synthetic speech signal based on the selected sequence, wherein the synthetic speech signal includes information indicative of one or more spectral features generated from at least one FSM included in the selected sequence.

15. The computer-readable memory of claim 14, wherein each of the N states of each FSM is based on a mean and a variance of one or more vectors aligned in a given state, wherein the one or more vectors are indicative of one or more spectral features of a segment of an associated recorded speech unit, and wherein N means and N variances are used to estimate a multi-mixture Gaussian density function in order to simulate an HMM.

16. The computer-readable memory of claim 14, wherein the functions further comprise determining one or more target HMMs that correspond to one of the one or more phonemes included in the one or more linguistic targets, wherein each of the one or more HMMs is trained from a corpus of recorded speech units and estimates one or more spectral features of a corresponding linguistic target over N states, and wherein one of the one or more possible sequences includes one or more FSMs interleaved with one or more HMMs.

17. The computer-readable memory of claim 16, wherein the cost function includes a penalty cost for each of the one or more HMMs.

18. A computing system comprising:

a data storage having stored therein program instructions and a plurality of fixed state machines ("FSMs"), wherein each FSM in the plurality of FSMs is a compressed recorded speech unit that simulates a Hidden Markov Model ("HMM") by averaging one or more spectral features of a recorded speech unit over N states, wherein N is positive integer; and a processor that, upon executing the program instructions stored in the data storage, is configured to cause the computing system to:

determine a phonemic representation of text that includes one or more linguistic targets, wherein each of the one or more linguistic targets includes one or more phonemes;

identify one or more FSMs included in the plurality of FSMs that correspond to one of the one or more phonemes included in the one or more linguistic targets;

determine one or more possible sequences of synthetic speech models based on the phonemic representation of text, wherein each of the one or more possible sequences includes at least one FSM;

determine, from the one or more possible sequences of synthetic speech models, a selected sequence that minimizes a value of a cost function, wherein the cost function represents a likelihood that one of the one or more possible sequences substantially matches the phonemic representation of text; and generate a synthetic speech signal based on the selected sequence, wherein the synthetic speech signal includes information indicative of one or more spectral features generated from at least one FSM included in the selected sequence.

19. The computing system of claim 18, wherein each of the N states of each FSM is based on a mean and a variance of one or more vectors aligned in a given state, wherein the one or more vectors are indicative of one or more spectral features of a segment of an associated recorded speech unit, and wherein N means and N variances are used to estimate a multi-mixture Gaussian density function in order to simulate an HMM.

20. The computing system of claim 18, further comprising an audio output component, wherein the processor, upon executing instructions stored in the data storage, is further configured to output the synthetic speech signal via the audio output component.

* * * * *